(12) United States Patent
Vermes

(10) Patent No.: US 10,374,835 B2
(45) Date of Patent: Aug. 6, 2019

(54) UNIVERSAL BROADBAND NETWORK GATEWAY

(71) Applicant: CenturyLink Intellectual Property LLC, Denver, CO (US)

(72) Inventor: Jonathan J. Vermes, Onalaska, WI (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 15/849,944

(22) Filed: Dec. 21, 2017

(65) Prior Publication Data

US 2018/0359119 A1    Dec. 13, 2018

Related U.S. Application Data

(60) Provisional application No. 62/518,127, filed on Jun. 12, 2017.

(51) Int. Cl.
*H04L 12/66* (2006.01)
*H04L 12/46* (2006.01)
(Continued)

(52) U.S. Cl.
CPC ............ *H04L 12/66* (2013.01); *H04L 12/413* (2013.01); *H04L 12/46* (2013.01); *H04L 12/4625* (2013.01); *H04L 41/0809* (2013.01); *H04Q 11/0067* (2013.01); *H04L 41/0886* (2013.01); *H04Q 2011/0079* (2013.01)

(58) Field of Classification Search
CPC ... H04L 12/66; H04L 29/08108; H04L 12/46; H04L 41/0886; H04N 21/436; H04N 21/43615; H04Q 1/028; H04Q 11/0067; H04Q 2011/0079; H04T 2001/105; H04W 28/0205; H04W 92/00; H04W 92/02; H04W 92/04; H04W 92/045; H04W 92/06; H04W 92/08; H04W 4112/66
See application file for complete search history.

(56) References Cited

U.S. PATENT DOCUMENTS 7,843,900 B2 * 11/2010 Gallagher ............. H04W 88/12
370/338
2002/0091795 A1 * 7/2002 Yip ..................... H04L 12/2852
709/218

(Continued)

*Primary Examiner* — Sharad Rampuria

(57) ABSTRACT

Novel tools and techniques are provided for implementing universal broadband network gateway functionality. In various embodiments, a first pluggable interface device may be removed from a port in a gateway device. A second pluggable interface device may be inserted into the port of the gateway device. The first and second pluggable interface devices each includes hardware and/or software configured to allow the gateway device to communicate with a network, each using different network communication technologies among a plurality of network communication technologies. The gateway device includes hardware and/or software that is common to the network communication technologies used by the first and second pluggable interface devices. The gateway device may then establish a communication link with the network via the second pluggable interface device, using the network communication technology used by the second pluggable interface device.

18 Claims, 6 Drawing Sheets

(51) Int. Cl.
  *H04Q 11/00*   (2006.01)
  *H04L 12/413*  (2006.01)
  *H04L 12/24*   (2006.01)

(56) References Cited

U.S. PATENT DOCUMENTS

2004/0117845 A1* 6/2004 Karaoguz ........ G08B 13/19658
  725/134
2011/0249606 A1* 10/2011 Zhang ................ H04L 12/1836
  370/312
2015/0052600 A1* 2/2015 Weinsberg .......... H04L 12/4641
  726/13

* cited by examiner

UNIVERSAL BROADBAND NETWORK GATEWAY

CROSS-REFERENCES TO RELATED APPLICATIONS

This application claims priority to U.S. patent application Ser. No. 62/518,127 (the "'127 Application"), filed Jun. 12, 2017 by Jonathan J. Vermes, entitled, "Universal Broadband Network Gateway," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing network communications, and, more particularly, to methods, systems, and apparatuses for implementing universal broadband network gateway functionality.

BACKGROUND

Today, network service providers have to inventory and select multiple pieces of hardware from multiple different vendors based primarily on the access medium being used (such as ADSL, VDSL, GPON, T1, etc.). For customers, when switching between one access technology to another (due to access technology limitations at particular geographical locations or due to the customers' decision to change services that requires a change in access technology, or the like), whole pieces of access technology have to be provided to the customer (while the old access hardware has to be shipped back to the service provider), which may require truck rolls or technician support on the part of the service provider to bring the customers' new network access technology online. This process is time consuming (for both the service provider and for the customers) and costly (in terms of equipment, technician support, service charges or fees, etc.).

Hence, there is a need for more robust and scalable solutions for implementing network communications, and, more particularly, to methods, systems, and apparatuses for implementing universal broadband network gateway functionality.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
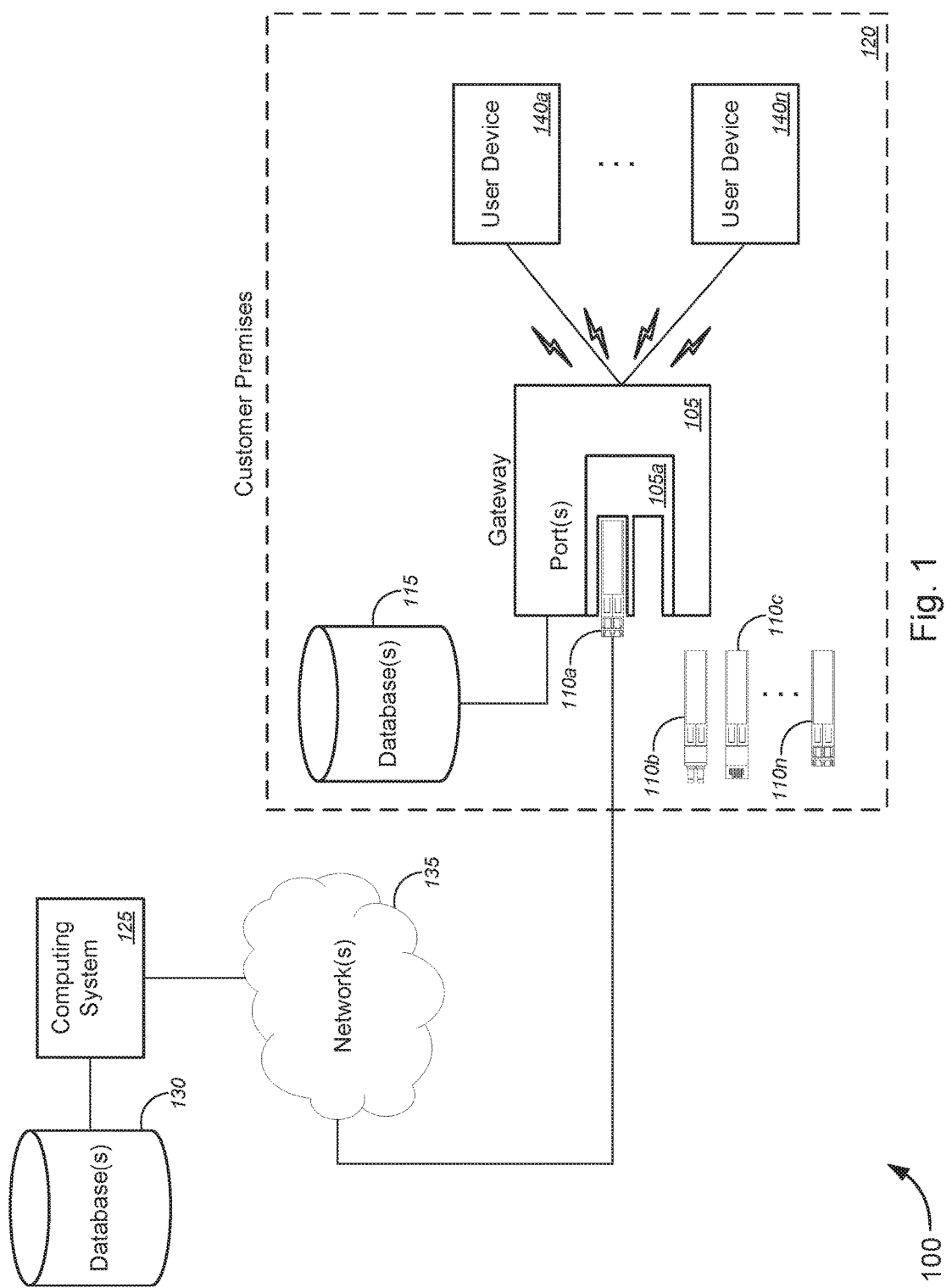
FIG. 1 is a schematic diagram illustrating a system for implementing universal broadband network gateway functionality, in accordance with various embodiments.

Various embodiments provide tools and techniques for implementing network communications, and, more particularly, to methods, systems, and apparatuses for implementing universal broadband network gateway functionality.

In various embodiments, a first pluggable interface device may be removed from a port in a gateway device, the first pluggable interface device comprising at least one of hardware or software configured to allow the gateway device to communicate with a network using a first network communication technology among a plurality of network communication technologies. A second pluggable interface device may be inserted into the port of the gateway device, the second pluggable interface device comprising at least one of hardware or software configured to allow the gateway device to communicate with the network using a second network communication technology among the plurality of network communication technologies, the second network communication technology being different from the first network communication technology, the gateway device comprising at least one of hardware or software that is common to at least the first network communication technology and the second network communication technology. The gateway device may then establish a communication link with the network via the second pluggable interface device, using the second network communication technology.

In some embodiments, the gateway device might include, without limitation, one of an optical network terminal ("ONT"), a network interface device ("NID"), an enhanced NID ("eNID"), a residential gateway ("RG") device, a business gateway ("BG") device, or a virtual gateway ("vG") device, and/or the like. In some cases, each of the first and second pluggable interface devices might be hot-swappable pluggable devices (also referred to as "hot pluggable devices" or the like).

According to some embodiments, each of the first and second pluggable interface devices might include, but is not limited to, one of a small form factor pluggable ("SFP") device, an enhanced SFP ("SFP+") device, a compact SFP ("CSFP") device, a 10 Gigabit SFP ("XFP") device, a gigabit interface converter ("GBIC"), or a mini GBIC, and wherein the port is configured to receive the one of the SFP device, the SFP+ device, the CSFP device, the XFP device, the GBIC, or the mini GBIC, and/or the like. In some cases, at least one of the SFP device, the SFP+ device, or the CSFP device, and/or the like, might include without limitation, at least one of a SFP network interface device ("NID"), a SFP router, a SFP modem, or a SFP wireless access point, and/or the like.

Merely by way of example, in some instances, the plurality of network communication technologies might include, without limitation, at least one of a T1 access connection technology, a digital signal-1("DS1") access connection technology, an xDSL (e.g., ADSL, VDSL, etc.) access connection technology, a WiFi access connection technology, 3G access connection technology, 4G access connection technology, 5G access connection technology, 700 MHz wireless access connection technology, a passive optical network ("PON") service technology, a gigabit PON ("GPON") service technology, an Ethernet fiber line service technology, an Ethernet PON ("EPON") service technology, a next generation PON ("NGPON") service technology, or a second generation NGPON or 40 Gigabit-capable PON ("NGPON2") service technology, and/or the like.

The various embodiments thus provide a gateway device that has common hardware and/or software across a plurality of network communication technologies, as well as swappable or pluggable interface devices (each type being based on different network communication technologies) that are inserted into, plugged into, or otherwise docked with one or more ports of the gateway device. In this manner, the gateway device itself need not be changed should the customer relocate and/or requests/subscribes to network services requiring a change in network access technologies. Rather, the customer need only swap out the pluggable interface device that is based on a first network communication (or access) technology, and insert the pluggable interface device that is based on the second network communication (or access technology). In some cases, for pluggable interface devices that are hot-swappable, there may not be any down time between plug-in and access (except for any configuration settings that need be changed, which would be initiated automatically). In other words, the various embodiments provide universal broadband network gateway functionality that is quick to implement (i.e., no need to ship equipment, send out technicians, or implement hook-ups or other excessive set-ups for the equipment to work), and is cost efficient (because much of the equipment is reused, and only the interface component (i.e., the pluggable interface devices) are changed out). These and various advantages of the invention are described in detail below with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, network access technology, and/or the like. In other aspects, certain embodiments, can improve the functioning of user equipment or systems themselves (e.g., gateway devices, network access devices, network access systems, etc.), for example, by providing a gateway having ports with which pluggable interface devices of a plurality of pluggable interface devices (that are based on different network access or communications technologies) may be docked (or inserted, etc.) and providing the pluggable interface devices, and by enabling the gateway device to establish communications links with a network regardless of what network access or communications technology the currently inserted pluggable interface device is based on, and/or the like. In particular, to the extent any abstract concepts are present in the various embodiments, those concepts can be implemented as described herein by devices, software, systems, and methods that involve specific novel functionality (e.g., steps or operations), such as providing a gateway having ports with which pluggable interface devices of a plurality of pluggable interface devices (that are based on different network access or communications technologies) may be docked (or inserted, etc.) and providing the pluggable interface devices, and by enabling the gateway device to establish communications links with a network regardless of what network access or communications technology the currently inserted pluggable interface device is based on, and in some cases providing hot-swappable functionality for the pluggable interface devices, and/or the like, to name a few examples, that extend beyond mere conventional computer processing operations. These functionalities can produce tangible results outside of the implementing computer system, including, merely by way of example, ease in changing network access technologies (in some cases, in a hot-swappable manner), while reducing costs and time in changing network access services, while also reducing the need to change out whole pieces of hardware for network access, and/or the like, at least some of which may be observed or measured by customers and/or service providers.

In an aspect, a method might comprise removing a first pluggable interface device from a port in a gateway device, the first pluggable interface device comprising at least one of hardware or software configured to allow the gateway device to communicate with a network using a first network communication technology among a plurality of network communication technologies. The method might also comprise inserting a second pluggable interface device into the port of the gateway device, the second pluggable interface device comprising at least one of hardware or software configured to allow the gateway device to communicate with the network using a second network communication technology among the plurality of network communication technologies, the second network communication technology being different from the first network communication technology, the gateway device comprising at least one of hardware or software that is common to at least the first network communication technology and the second network communication technology. The method might further comprise establishing, with the gateway device, a communication link with the network via the second pluggable interface device, using the second network communication technology.

In some embodiments, the gateway device comprises one of an optical network terminal ("ONT"), a network interface device ("NID"), an enhanced NID ("eNID"), a residential gateway ("RG") device, a business gateway ("BG") device, or a virtual gateway ("vG") device, and/or the like. In some cases, each of the first and second pluggable interface devices might be hot-swappable pluggable devices. According to some embodiments, each of the first and second pluggable interface devices might comprise one of a small form factor pluggable ("SFP") device, an enhanced SFP ("SFP+") device, a compact SFP ("CSFP") device, a 10 Gigabit SFP ("XFP") device, a gigabit interface converter ("GBIC"), or a mini GBIC, and/or the like, and wherein the port might be configured to receive the one of the SFP device, the SFP+ device, the CSFP device, the XFP device, the GBIC, or the mini GBIC, and/or the like. In some instances, at least one of the SFP device, the SFP+ device, or the CSFP device might comprise at least one of a SFP network interface device ("NID"), a SFP router, a SFP modem, or a SFP wireless access point, and/or the like.

Merely by way of example, in some cases, the plurality of network communication technologies might comprise at least one of a T1 access connection technology, a digital signal-1("DS1") access connection technology, an xDSL access connection technology, a WiFi access connection technology, 3G access connection technology, 4G access connection technology, 5G access connection technology, 700 MHz wireless access connection technology, a passive optical network ("PON") service technology, a gigabit PON ("GPON") service technology, an Ethernet fiber line service technology, an Ethernet PON ("EPON") service technology, a next generation PON ("NGPON") service technology, or a second generation NGPON or 40 Gigabit-capable PON ("NGPON2") service technology, and/or the like.

According to some embodiments, the method might further comprise determining, with the gateway device, whether a pluggable interface device is inserted into the port; and based on a determination that the pluggable interface device is inserted into the port, automatically initiating, with the gateway device, configuration settings between the gateway device and the pluggable interface device that is inserted into the port. In some cases, automatically initiating configuration settings between the gateway device and the pluggable interface device that is inserted into the port might comprise: identifying, with the gateway device, a network communication technology among the plurality of network communication technologies that is associated with the pluggable interface device that is inserted into the port; retrieving, with the gateway device, configuration settings associated with the identified network communication technology from a data store, wherein the data store is at least one of a data store local to the gateway device or a remote data store accessible via the network; and automatically initiating, with the gateway device, the retrieved configuration settings between the gateway device and the pluggable interface device that is inserted into the port.

In another aspect, a gateway device might comprise a port. The port might receive one of a plurality of pluggable interface devices, each pluggable interface device comprising at least one of hardware or software configured to allow the gateway device to communicate with a network using one network communication technology among a plurality of network communication technologies, at least two of the plurality of pluggable interface devices being different from each other. The gateway device might further comprise at least one processor and a non-transitory computer readable medium communicatively coupled to the at least one processor. The non-transitory computer readable medium might have stored thereon computer software comprising a set of instructions that, when executed by the at least one processor, causes the gateway device to: determine whether a pluggable interface device is inserted into the port; based on a determination that the pluggable interface device is inserted into the port, automatically initiate configuration settings between the gateway and the pluggable interface device that is inserted into the port; and establish a communication link with the network via the pluggable interface device that is inserted into the port, using the network communication technology associated with the pluggable interface device that is inserted into the port.

In some embodiments, the gateway device comprises one of an optical network terminal ("ONT"), a network interface device ("NID"), an enhanced NID ("eNID"), a residential gateway ("RG") device, a business gateway ("BG") device, or a virtual gateway ("vG") device, and/or the like. In some cases, each of the first and second pluggable interface devices might be hot-swappable pluggable devices. According to some embodiments, each of the first and second pluggable interface devices might comprise one of a small form factor pluggable ("SFP") device, an enhanced SFP ("SFP+") device, a compact SFP ("CSFP") device, a 10 Gigabit SFP ("XFP") device, a gigabit interface converter ("GBIC"), or a mini GBIC, and/or the like, and wherein the port might be configured to receive the one of the SFP device, the SFP+ device, the CSFP device, the XFP device, the GBIC, or the mini GBIC, and/or the like. In some instances, at least one of the SFP device, the SFP+ device, or the CSFP device might comprise at least one of a SFP network interface device ("NID"), a SFP router, a SFP modem, or a SFP wireless access point, and/or the like.

Merely by way of example, in some cases, the plurality of network communication technologies might comprise at least one of a T1 access connection technology, a digital signal-1("DS1") access connection technology, an xDSL access connection technology, a WiFi access connection technology, 3G access connection technology, 4G access connection technology, 5G access connection technology, 700 MHz wireless access connection technology, a passive optical network ("PON") service technology, a gigabit PON ("GPON") service technology, an Ethernet fiber line service technology, an Ethernet PON ("EPON") service technology, a next generation PON ("NGPON") service technology, or a second generation NGPON or 40 Gigabit-capable PON ("NGPON2") service technology, and/or the like.

In yet another aspect, a system might comprise a first pluggable interface device, a second pluggable interface device, and a gateway device. The first pluggable interface device might comprise at least one of hardware or software configured to allow the gateway device, a port of which the first pluggable interface device might be inserted, to communicate with a network using a first network communication technology among a plurality of network communication technologies. The second pluggable interface device might comprise at least one of hardware or software configured to allow the gateway device, the port of which the second pluggable interface device might be inserted, to communicate with the network using a second network communication technology among the plurality of network communication technologies. The gateway device might comprise the port. The port might receive one of a plurality of pluggable interface devices, each pluggable interface device comprising at least one of hardware or software configured to allow the gateway device to communicate with the network using one network communication technology among the plurality of network communication technologies, the second network communication technology being different from the first network communication technology, wherein the gateway device comprises at least one of hardware or software that is common to at least the first network communication technology and the second network communication technology. The gateway device might further comprise at least one processor and a non-transitory computer readable medium communicatively coupled to the at least one processor. The non-transitory computer readable medium might have stored thereon computer software comprising a set of instructions that, when executed by the at least one processor, causes the gateway device to: determine whether a pluggable interface device is inserted into the port; based on a determination that the pluggable interface device is inserted into the port, automatically initiate configuration settings between the gateway and the pluggable interface device that is inserted into the port; and establish a communication link with the network via the pluggable interface device that is inserted into the port, using the network communication technology associated with the pluggable interface device that is inserted into the port.

In some embodiments, the gateway device comprises one of an optical network terminal ("ONT"), a network interface device ("NID"), an enhanced NID ("eNID"), a residential gateway ("RG") device, a business gateway ("BG") device, or a virtual gateway ("vG") device, and/or the like. In some cases, each of the first and second pluggable interface devices might be hot-swappable pluggable devices. According to some embodiments, each of the first and second pluggable interface devices might comprise one of a small form factor pluggable ("SFP") device, an enhanced SFP ("SFP+") device, a compact SFP ("CSFP") device, a 10 Gigabit SFP ("XFP") device, a gigabit interface converter ("GBIC"), or a mini GBIC, and/or the like, and wherein the port might be configured to receive the one of the SFP device, the SFP+ device, the CSFP device, the XFP device, the GBIC, or the mini GBIC, and/or the like. In some instances, at least one of the SFP device, the SFP+ device, or the CSFP device might comprise at least one of a SFP network interface device ("NID"), a SFP router, a SFP modem, or a SFP wireless access point, and/or the like.

Merely by way of example, in some cases, the plurality of network communication technologies might comprise at least one of a T1 access connection technology, a digital signal-1("DS1") access connection technology, an xDSL access connection technology, a WiFi access connection technology, 3G access connection technology, 4G access connection technology, 5G access connection technology, 700 MHz wireless access connection technology, a passive optical network ("PON") service technology, a gigabit PON ("GPON") service technology, an Ethernet fiber line service technology, an Ethernet PON ("EPON") service technology, a next generation PON ("NGPON") service technology, or a second generation NGPON or 40 Gigabit-capable PON ("NGPON2") service technology, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing network communications, and, more particularly, to methods, systems, and apparatuses for implementing universal broadband network gateway functionality, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing universal broadband network gateway functionality, in accordance with various embodiments.

In the non-limiting embodiment of FIG. 1, system 100 might comprise a gateway device 105, one or more pluggable interface devices 110*a*, 110*b*, 110*c*, through 110*n* (collectively, "pluggable interface devices 110" or "interface devices 110," or the like), and local database(s) 115, all of which might be disposed or located within customer premises 120, or the like. In some cases, customer premises 120 might include, but is not limited to, one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, and/or the like.

According to some embodiments, system 100 might further comprise a computing system 125 and corresponding database(s) 130, both of which might be accessible by the gateway 105 via network 135.

The gateway device 105 might comprise one or more ports 105*a*, each of which might receive one of a plurality of pluggable interface devices 110. Although two ports 105*a* are depicted in gateway 105 in FIG. 1, the various embodiments are not so limited, and gateway 105 can have any suitable number of ports 105*a*. Each pluggable interface device 110 might include, without limitation, at least one of hardware or software configured to allow the gateway device 105 to communicate with a network 135 using one network communication technology among a plurality of network communication technologies, at least two of the plurality of pluggable interface devices 110a-110n being different from each other. In some cases, the network(s) 135 might include, but is not limited to, at least one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

In some embodiments, the gateway device 105 might include, without limitation, one of an optical network terminal ("ONT"), a network interface device ("NID"), an enhanced NID ("eNID"), a residential gateway ("RG") device, a business gateway ("BG") device, or a virtual gateway ("vG") device, and/or the like. In some cases, each of the first and second pluggable interface devices might be hot-swappable pluggable devices (also referred to as "hot pluggable devices" or the like). In other words, the pluggable interface devices might be replaced or added without stopping, rebooting, or shutting down the computing system (in this case, the gateway device). This allows the gateway device to continue functioning without interrupting or disrupting its operation even when pluggable interface devices are removed or inserted. This is in contrast to cold-swappable components, which require the computing system to be powered down in order to add or remove such components.

According to some embodiments, each of the first and second pluggable interface devices might include, but is not limited to, one of a small form factor pluggable ("SFP") device, an enhanced SFP ("SFP+") device, a compact SFP ("CSFP") device, a 10 Gigabit SFP ("XFP") device, a gigabit interface converter ("GBIC"), or a mini GBIC, and wherein the port is configured to receive the one of the SFP device, the SFP+ device, the CSFP device, the XFP device, the GBIC, or the mini GBIC, and/or the like. In some cases, at least one of the SFP device, the SFP+ device, or the CSFP device, and/or the like, might include without limitation, at least one of a SFP network interface device ("NID"), a SFP router, a SFP modem, or a SFP wireless access point, and/or the like.

Merely by way of example, in some instances, the plurality of network communication technologies might include, without limitation, at least one of a T1 access connection technology, a digital signal-1("DS1") access connection technology, an xDSL (e.g., ADSL, VDSL, etc.) access connection technology, a WiFi access connection technology, 3G access connection technology, 4G access connection technology, 5G access connection technology, 700 MHz wireless access connection technology, a passive optical network ("PON") service technology, a gigabit PON ("GPON") service technology, an Ethernet fiber line service technology, an Ethernet PON ("EPON") service technology, a next generation PON ("NGPON") service technology, or a second generation NGPON or 40 Gigabit-capable PON ("NGPON2") service technology, and/or the like.

In operation, a first pluggable interface device 110a may be removed from the port 105a in the gateway device 105, the first pluggable interface device 110a comprising at least one of hardware or software configured to allow the gateway device to communicate with network 135 using a first network communication technology among a plurality of network communication technologies. A second pluggable interface device (i.e., one of pluggable interfaces 110b-110n) may be inserted into the port 105a of the gateway device 105, the second pluggable interface device (i.e., the one of pluggable interfaces 110b-110n) comprising at least one of hardware or software configured to allow the gateway device to communicate with the network using a second network communication technology among the plurality of network communication technologies, the second network communication technology being different from the first network communication technology, the gateway device comprising at least one of hardware or software that is common to at least the first network communication technology and the second network communication technology. The gateway device 105 may then establish a communication link with the network 135 via the second pluggable interface device (i.e., one of pluggable interfaces 110b-110n), using the second network communication technology.

In some embodiments, configuration settings for establishing the communication link with the network 135 via the second pluggable interface device may be retrieved from a database local to the gateway device 105 or from database 130 (via computing system 125 and network(s) 135), or the like. According to some embodiments, after establishing the communication line with the network 135 via the second pluggable interface device, the gateway 105 might communicatively couple with at least one of one or more user devices 140a-140n (collectively, "user devices 140" or the like) either via wireless communication (as depicted by the lightning bolt symbols in FIG. 1) or via wired communication (as depicted by the solid lines between the gateway 105 and each of the user devices 140 in FIG. 1), or the like. In some cases, each of the one or more user devices 140 might include, but is not limited to, one of a laptop computer, a tablet computer, a smart phone, a mobile phone, a personal digital assistant, a remote control device, or a portable gaming device, and/or the like.

In some aspects, at least one of the pluggable interface devices 110 might be a multi-rate SFP or the like, which might itself be capable of communicating using multiple communications protocols (rather than a single protocol) and/or multiple rates of communication. In some cases, at least one of the pluggable interface devices 110 might have the footprint and external form or structure of conventional SFPs but may have internal hardware and/or software that uses network communications technologies not conventionally used by typical SFPs.

These and other functionalities and features of the gateway 105 and/or the pluggable interface devices are described in detail below with respect to FIGS. 2-4.

Figure 2:
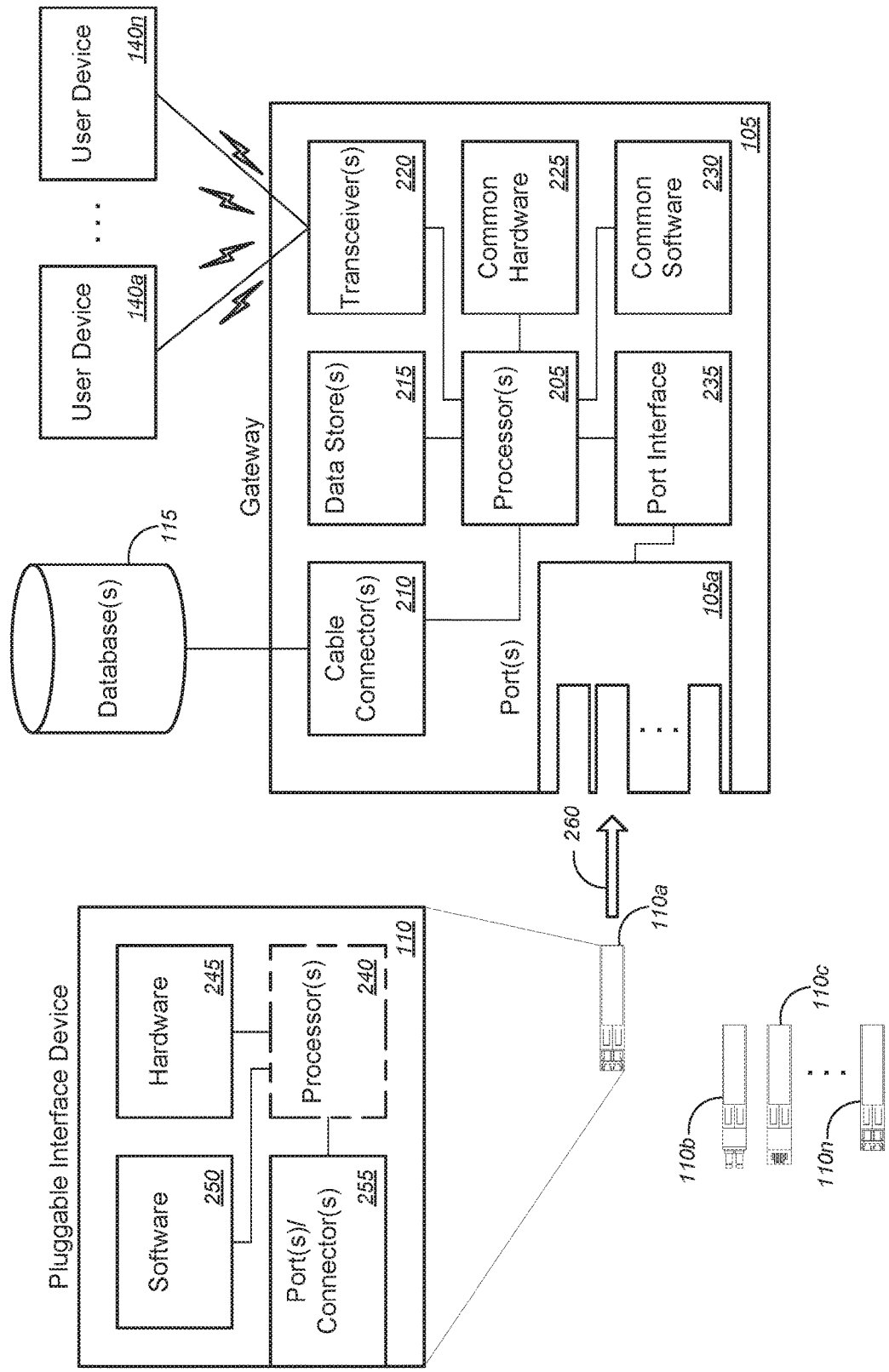
FIG. 2 is a schematic diagram illustrating another system for implementing universal broadband network gateway functionality, in accordance with various embodiments.

FIG. 2 is a schematic diagram illustrating another system 200 for implementing universal broadband network gateway functionality, in accordance with various embodiments.

In the non-limiting embodiment of FIG. 2, system 200 might comprise a gateway device 105, one or more pluggable interface devices 110a, 110b, 110c, through 110n (collectively, "pluggable interface devices 110" or "interface devices 110," or the like), local database(s) 115, and one or more user devices 140a-140n (collectively, "user devices 140" or the like).

In some embodiments, the gateway device 105 might include, without limitation, one or more processors 205, one or more communications cable connectors 210, one or more built-in or internal data stores 215, one or more transceivers 220, common hardware 225, common software 230, a port interface(s) 235, and one or more ports 105a, and/or the like. In some cases, the gateway device might include, without limitation, one of an optical network terminal ("ONT"), a network interface device ("NID"), an enhanced NID ("eNID"), a residential gateway ("RG") device, a business gateway ("BG") device, or a virtual gateway ("vG") device, and/or the like.

The one or more communications cable connectors 210 might communicatively couple with one or more external yet local data stores or databases 115. The one or more transceivers 220 might communicatively couple the gateway device 105 with at least one of the one or more user devise 140 either via wireless communication (as depicted by the lightning bolt symbols in FIG. 2) or via wired communication (as depicted by the solid lines between the gateway 105 and each of the user devices 140 in FIG. 2), or the like. The common hardware 225 and/or the common software 230 are hardware and/or software that are common to most, if not all, of the plurality of disparate network communication technologies upon which the one or more pluggable interface devices 110a-110n are based (i.e., network communication technologies that allow the pluggable interface devices 110 to provide network access to the gateway device 105 and/or to provide network access to user devices 140 via the gateway device 105. Merely by way of example, the plurality of network communication technologies might include, without limitation, at least one of a T1 access connection technology, a digital signal-1 ("DS1") access connection technology, an xDSL access connection technology, a WiFi access connection technology, 3G access connection technology, 4G access connection technology, 5G access connection technology, 700 MHz wireless access connection technology, a passive optical network ("PON") service technology, a gigabit PON ("GPON") service technology, an Ethernet fiber line service technology, an Ethernet PON ("EPON") service technology, a next generation PON ("NGPON") service technology, or a second generation NGPON or 40 Gigabit-capable PON ("NGPON2") service technology, and/or the like.

According to some embodiments, each of at least one of the one or more pluggable interface devices 110 might include, but is not limited to, one or more processors 240 (optional), at least one of hardware 245 and/or software 250, and one or more ports or connectors 255, and/or the like. The one or more (optional) processors 240 might be either sophisticated processors (like CPUs or the processors 205 of the gateway device 105) that execute the software 250 or streamlined microprocessors that run simple code. Alternatively, at least one of the pluggable interface devices 110 might simply be a physical connector interface without any processing of code or instructions to interface between a communications line from the network and the gateway device 105. In such embodiments, the gateway 105 might perform any processing of the signals transmitted through the communications line to provide communications between at least one of the user devices 140 and the network.

In some embodiments, each of the first and second pluggable interface devices might include, without limitation, one of a small form factor pluggable ("SFP") device, an enhanced SFP ("SFP+") device, a compact SFP ("CSFP") device, a 10 Gigabit SFP ("XFP") device, a gigabit interface converter ("GBIC"), or a mini GBIC, and wherein the port is configured to receive the one of the SFP device, the SFP+ device, the CSFP device, the XFP device, the GBIC, or the mini GBIC, and/or the like. In some instances, at least one of the SFP device, the SFP+ device, or the CSFP device might include, but is not limited to, at least one of a SFP network interface device ("NID"), a SFP router, a SFP modem, or a SFP wireless access point, and/or the like. According to some embodiments, each of the first and second pluggable interface devices are hot-swappable pluggable devices.

In operation, a pluggable interface device 110 might be inserted into, plugged into, or otherwise docked with a port 105a of the gateway device (as denoted by the arrow 260 in FIG. 2, or the like). The pluggable interface device 110 (whether hot-swappable or not) might provide an interface between the gateway and particular communications lines from the network associated with (or based on) one of the plurality of network communications technologies described above. For example, the particular communications lines might be one of fiber optic based, copper cable based, Ethernet cable based, etc. By providing such swappable or pluggable interface devices 110, a network service provider customer need only be provided with a gateway device 105 having common functionalities, with particular pluggable interface devices 110 being based on particular network communication technologies being provided to the customer based on the network communication technologies available in the customer's neighborhood or office location and based on the network services subscribed to by the customer. If the customer changes services that requires changing the network communication technologies (e.g., cable Internet to GPON, or the like), the customer need only swap out the pluggable interface device 110 associated with the first network communication technology (in this example, cable Internet based pluggable interface device) and insert the pluggable interface device 110 associated with the second network communication technology (in this example, GPON based pluggable interface device). This swappable functionality is also useful for customers who move to different geographical locations having different network technologies prevalent or available at such locations.

The gateway device 105, the one or more pluggable interface devices 110a-110n, the database(s) 115, and the user devices 140a-140n of system 200 in FIG. 2 might otherwise be similar, if not identical, to the gateway device 105, the one or more pluggable interface devices 110a-110n, the database(s) 115, and the user devices 140a-140n, respectively, of system 100 in FIG. 1, and the descriptions of these components of system 100 are applicable to the corresponding components of system 200, and vice versa.

Figure 3:
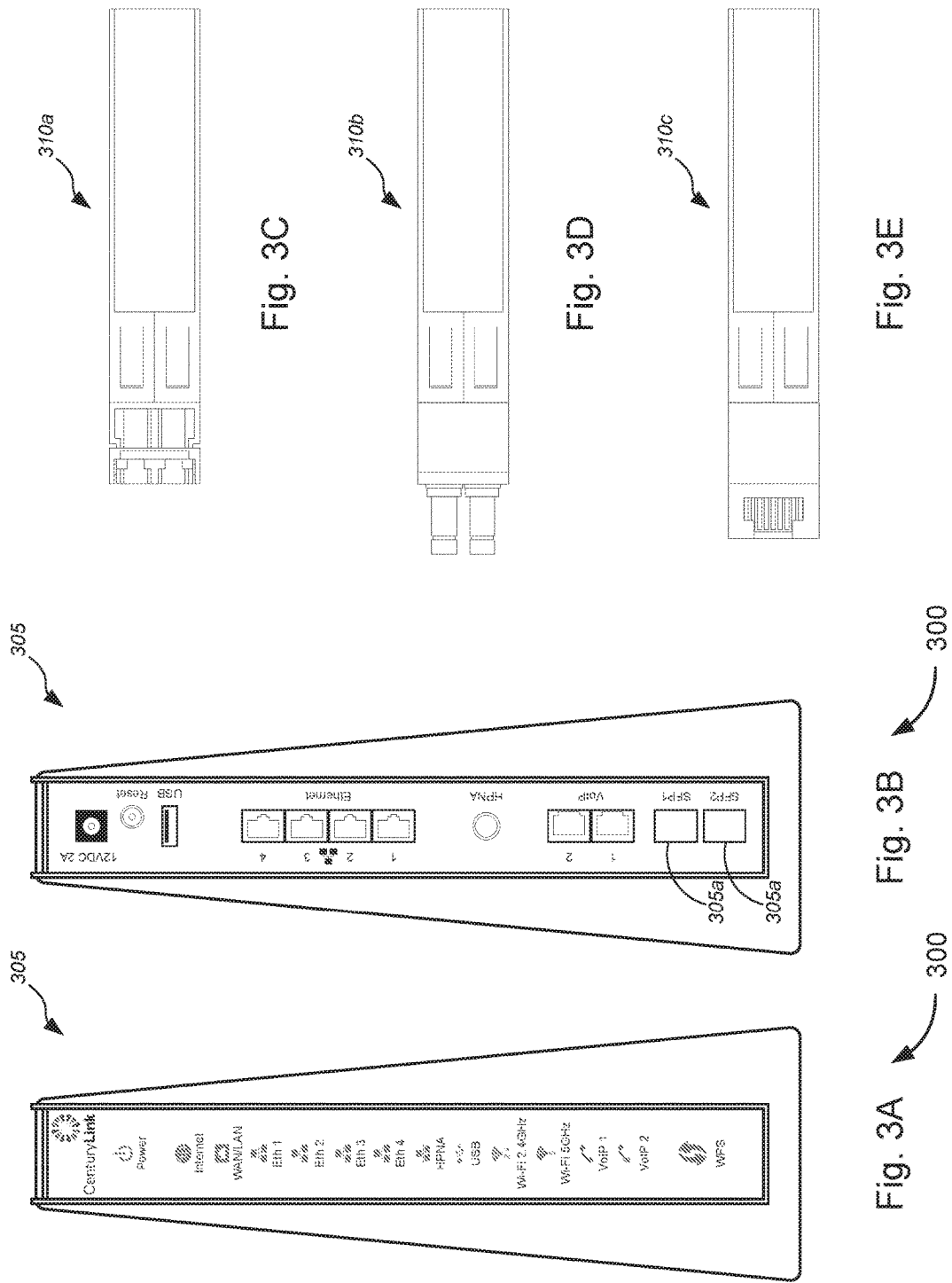
FIGS. 3A and 3B are schematic diagrams illustrating a front elevation view (FIG. 3A) and a rear elevation view (FIG. 3B) of an embodiment of a universal broadband network gateway device.
FIGS. 3C-3E are schematic diagrams illustrating various embodiments of pluggable interface devices that may be removably inserted into ports of a universal broadband network gateway device to implement universal broadband network gateway functionality, in accordance with various embodiments.

FIGS. 3A and 3B are schematic diagrams illustrating a front elevation view (FIG. 3A) and a rear elevation view (FIG. 3B) of an embodiment 300 of a universal broadband network gateway device. FIGS. 3C-3E are schematic diagrams illustrating various embodiments of pluggable interface devices that may be removably inserted into ports of a universal broadband network gateway device to implement universal broadband network gateway functionality, in accordance with various embodiments. Although particular configurations and designs of the gateway device 305 and the pluggable interface devices 310a-310c are depicted in FIGS. 3A-3E (collectively, "FIG. 3"), the various embodiments are not so limited, and the gateway device 305 and each of the pluggable interface devices 310a-310c may have any suitable configuration and/or design that allows the gateway device 305 to implement universal broadband network gateway functionality.

With reference to FIG. 3, gateway device 305 might have one or more ports 305a into each of which might be inserted into, plugged into, or otherwise docked a pluggable interface device 310. FIGS. 3C-3E depict non-limiting examples of pluggable interface devices 310a-310c among a plurality of such pluggable interface devices 310 that may be inserted into, plugged into, or otherwise docked with one or more ports 305a of the gateway device 305.

In some embodiments, the gateway device 305 might include, without limitation, one of an optical network terminal ("ONT"), a network interface device ("NID"), an enhanced NID ("eNID"), a residential gateway ("RG") device, a business gateway ("BG") device, or a virtual gateway ("vG") device, and/or the like. In some cases, each of one or more of the plurality of pluggable interface devices 310 might be hot-swappable pluggable devices (also referred to as "hot pluggable devices" or the like). In other words, the pluggable interface devices might be replaced or added without stopping, rebooting, or shutting down the computing system (in this case, the gateway device). This allows the gateway device to continue functioning without interrupting or disrupting its operation even when pluggable interface devices are removed or inserted. This is in contrast to cold-swappable components, which require the computing system to be powered down in order to add or remove such components.

According to some embodiments, each of the plurality of pluggable interface devices 310 might include, but is not limited to, one of a small form factor pluggable ("SFP") device, an enhanced SFP ("SFP+") device, a compact SFP ("CSFP") device, a 10 Gigabit SFP ("XFP") device, a gigabit interface converter ("GBIC"), or a mini GBIC, and wherein the port 305a is configured to receive the one of the SFP device, the SFP+ device, the CSFP device, the XFP device, the GBIC, or the mini GBIC, and/or the like. In some cases, at least one of the SFP device, the SFP+ device, or the CSFP device, and/or the like, might include without limitation, at least one of a SFP network interface device ("NID"), a SFP router, a SFP modem, or a SFP wireless access point, and/or the like.

Merely by way of example, in some instances, the plurality of network communication technologies might include, without limitation, at least one of a T1 access connection technology, a digital signal-1("DS1") access connection technology, an xDSL access connection technology, a WiFi access connection technology, 3G access connection technology, 4G access connection technology, 5G access connection technology, 700 MHz wireless access connection technology, a passive optical network ("PON") service technology, a gigabit PON ("GPON") service technology, an Ethernet fiber line service technology, an Ethernet PON ("EPON") service technology, a next generation PON ("NGPON") service technology, or a second generation NGPON or 40 Gigabit-capable PON ("NGPON2") service technology, and/or the like.

The gateway device 305 and the one or more pluggable interface devices 310 of embodiment 300 in FIG. 3 might otherwise be similar, if not identical, to the gateway device 105, the one or more pluggable interface devices 110a-110n, the database(s) 115, and the user devices 140a-140n, respectively, of system 100 in FIG. 1 or of system 200 in FIG. 2, and the descriptions of these components of system 100 or system 200 are applicable to the corresponding components of embodiment 300, and vice versa.

Figure 4:
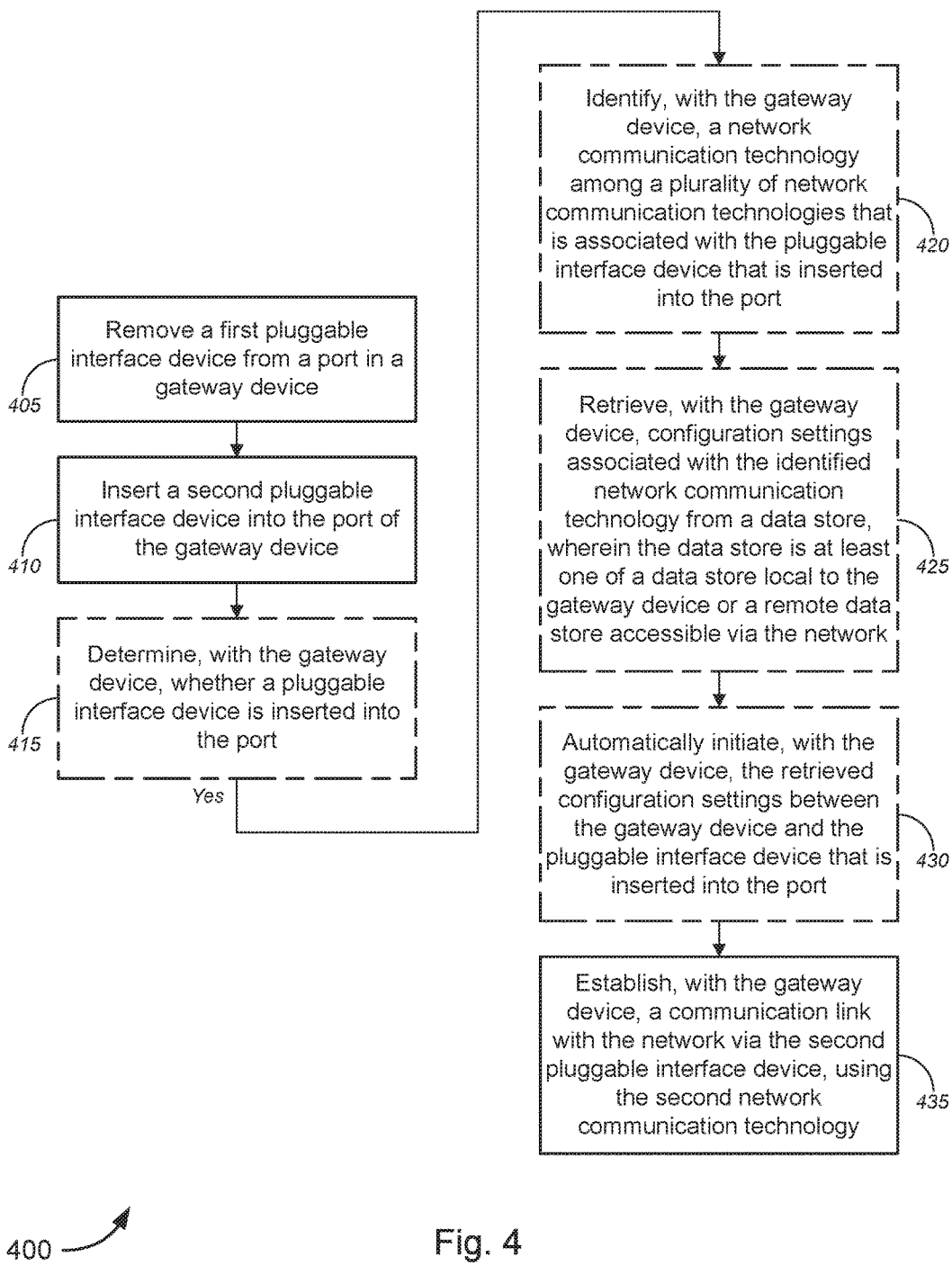
FIG. 4 is a flow diagram illustrating a method for implementing universal broadband network gateway functionality, in accordance with various embodiments.

FIG. 4 is a flow diagram illustrating a method 400 for implementing universal broadband network gateway functionality, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems and embodiments 100, 200, and 300 of FIGS. 1, 2, and 3, respectively (or components thereof), such methods may also be implemented using any suitable hardware (or software) implementation. Similarly, while each of the systems and embodiments 100, 200, and 300 of FIGS. 1, 2, and 3, respectively (or components thereof), can operate according to the method 400 illustrated by FIG. 4 (e.g., by executing instructions embodied on a computer readable medium), the systems and embodiments 100, 200, and 300 of FIGS. 1, 2, and 3 can each also operate according to other modes of operation and/or perform other suitable procedures.

In the non-limiting embodiment of FIG. 4A, method 400, at block 405, might comprise removing a first pluggable interface device from a port in a gateway device. The first pluggable interface device might comprise at least one of hardware or software configured to allow the gateway device to communicate with a network using a first network communication technology among a plurality of network communication technologies. At block 410, method 400 might comprise inserting a second pluggable interface device into the port of the gateway device. The second pluggable interface device might comprise at least one of hardware or software configured to allow the gateway device to communicate with the network using a second network communication technology among the plurality of network communication technologies. The second network communication technology might be different from the first network communication technology. The gateway device might comprise at least one of hardware or software that is common to at least the first network communication technology and the second network communication technology (and in some cases, common to most, if not all, of the plurality of network communication technologies).

In some embodiments, method 400 might further comprise determining, with the gateway device, whether a pluggable interface device is inserted into the port (optional block 415). Here, the gateway device might determine that a pluggable interface device (in this case, the second pluggable interface device) is inserted into the port. Based on such determination, method 400 might further comprise identifying, with the gateway device, a network communication technology (in this case, the second network communication technology) among the plurality of network communication technologies that is associated with the pluggable interface device that is inserted into the port (in this case, the second pluggable interface device) (optional block 420); retrieving, with the gateway device, configuration settings associated with the identified network communication technology (in this case, the second network communication technology) from a data store, wherein the data store is at least one of a data store local to the gateway device (e.g., database 115 of FIGS. 1 and 2, or the like) or a remote data store accessible via the network (e.g., database 130 of FIG. 1, or the like) (optional block 425); and automatically initiating, with the gateway device, the retrieved configuration settings between the gateway device and the pluggable interface device that is inserted into the port (in this case, the second pluggable interface device) (optional block 430).

At block 435, method 400 might comprise establishing, with the gateway device, a communication link with the network via the second pluggable interface device, using the second network communication technology.

In some embodiments, the gateway device might include, without limitation, one of an optical network terminal ("ONT"), a network interface device ("NID"), an enhanced NID ("eNID"), a residential gateway ("RG") device, a business gateway ("BG") device, or a virtual gateway ("vG") device, and/or the like. In some cases, each of the first and second pluggable interface devices might be hot-swappable pluggable devices (also referred to as "hot pluggable devices" or the like). In other words, the pluggable interface devices might be replaced or added without stopping, rebooting, or shutting down the computing system (in this case, the gateway device). This allows the gateway device to continue functioning without interrupting or disrupting its operation even when pluggable interface devices are removed or inserted. This is in contrast to cold-swappable components, which require the computing system to be powered down in order to add or remove such components.

According to some embodiments, each of the first and second pluggable interface devices might include, but is not limited to, one of a small form factor pluggable ("SFP") device, an enhanced SFP ("SFP+") device, a compact SFP ("CSFP") device, a 10 Gigabit SFP ("XFP") device, a gigabit interface converter ("GBIC"), or a mini GBIC, and wherein the port is configured to receive the one of the SFP device, the SFP+ device, the CSFP device, the XFP device, the GBIC, or the mini GBIC, and/or the like. In some cases, at least one of the SFP device, the SFP+ device, or the CSFP device, and/or the like, might include without limitation, at least one of a SFP network interface device ("NID"), a SFP router, a SFP modem, or a SFP wireless access point, and/or the like.

Merely by way of example, in some instances, the plurality of network communication technologies might include, without limitation, at least one of a T1 access connection technology, a digital signal-1("DS1") access connection technology, an xDSL access connection technology, a WiFi access connection technology, 3G access connection technology, 4G access connection technology, 5G access connection technology, 700 MHz wireless access connection technology, a passive optical network ("PON") service technology, a gigabit PON ("GPON") service technology, an Ethernet fiber line service technology, an Ethernet PON ("EPON") service technology, a next generation PON ("NGPON") service technology, or a second generation NGPON or 40 Gigabit-capable PON ("NGPON2") service technology, and/or the like.

Exemplary System and Hardware Implementation

Figure 5:
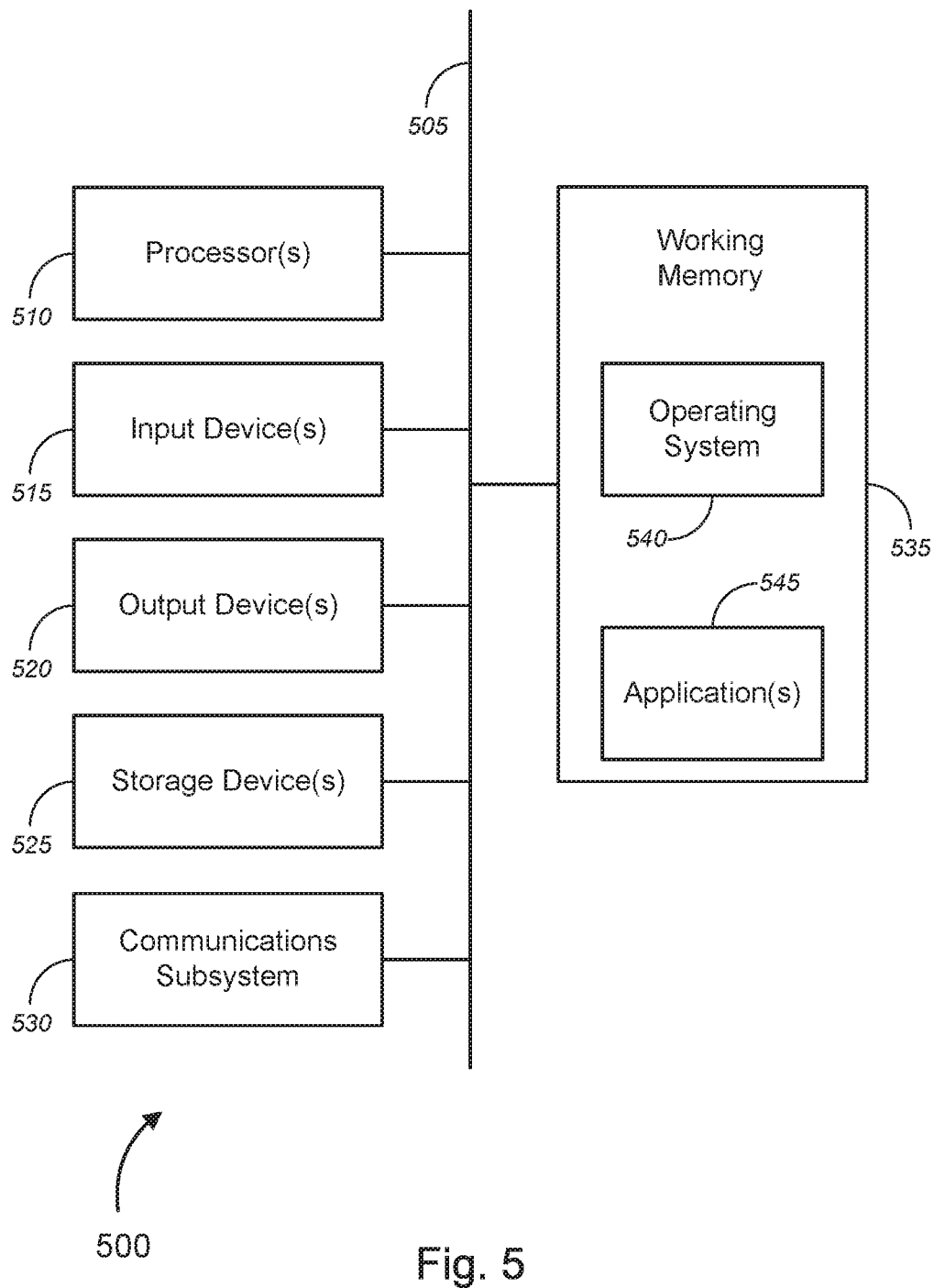
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., gateway devices 105 and 305, pluggable interface devices 110a-110n, 110, and 310a-310c, computing system 125, and 305, user devices 120, audio playback devices 140a-140n, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., gateway devices 105 and 305, pluggable interface devices 110a-110n, 110, and 310a-310c, computing system 125, and 305, user devices 120, audio playback devices 140a-140n, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
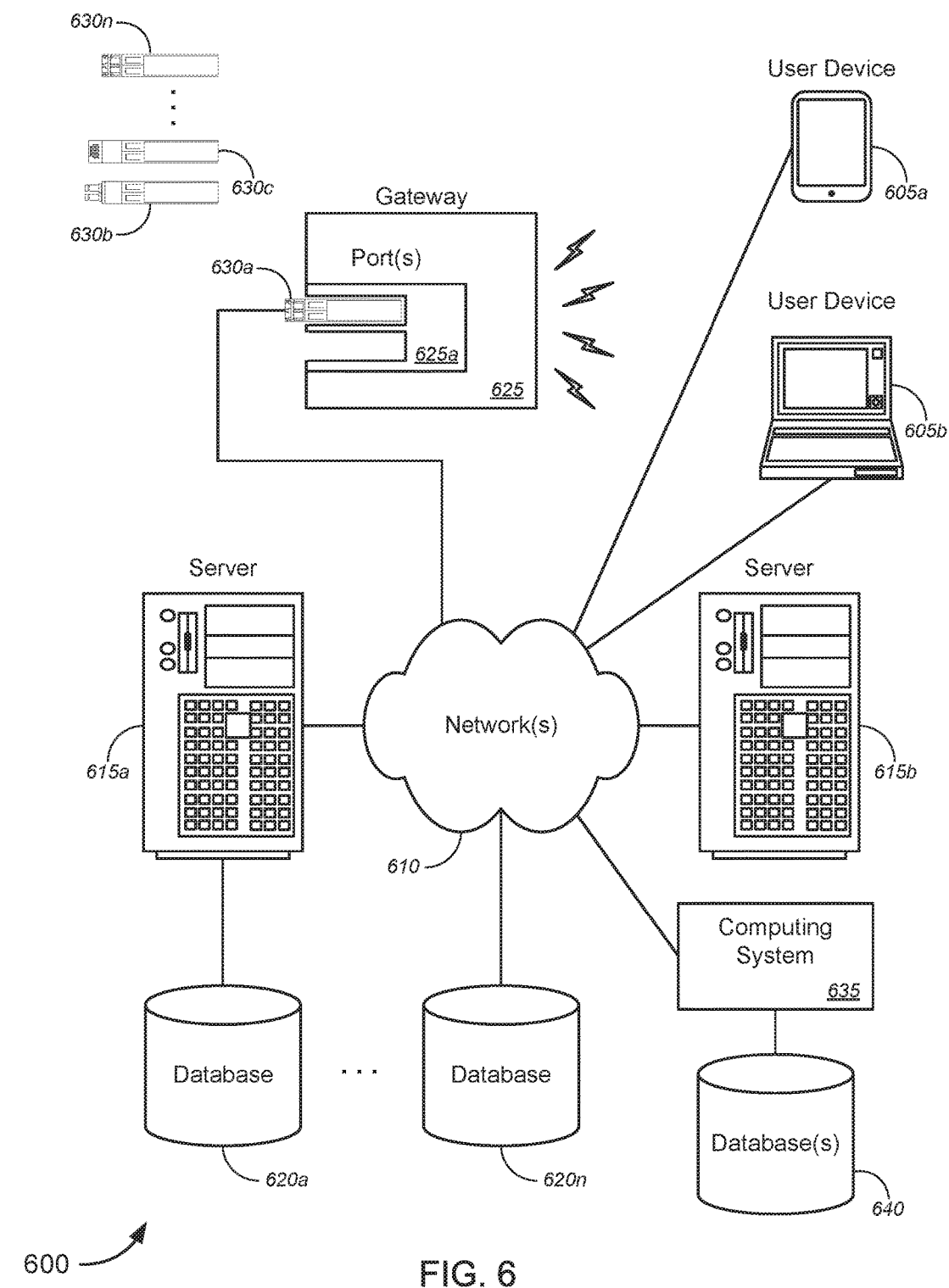
FIG. 6 is a block diagram illustrating a networked system of computers, computing systems, or system hardware architecture, which can be used in accordance with various embodiments.

As noted above, a set of embodiments comprises methods and systems for implementing network communications, and, more particularly, to methods, systems, and apparatuses for implementing universal broadband network gateway functionality. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 135 FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing network communications, and, more particularly, to methods, systems, and apparatuses for implementing universal broadband network gateway functionality, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a gateway device 625, one or more pluggable interface devices 630a, 630b, 630c, through 630n (collectively, "pluggable interface devices 630" or "interface devices 630," or the like), and computing system 635 and corresponding database(s) 640. The gateway device 625 might comprise one or more ports 625a, each of which might receive one of a plurality of pluggable interface devices 630. Each pluggable interface device 630 might include, without limitation, at least one of hardware or software configured to allow the gateway device 625 to communicate with a network 610 using one network communication technology among a plurality of network communication technologies, at least two of the plurality of pluggable interface devices 630a-630n being different from each other.

In operation, a first pluggable interface device 630a may be removed from the port 625a in the gateway device 625, the first pluggable interface device 630a comprising at least one of hardware or software configured to allow the gateway device to communicate with network 610 using a first network communication technology among a plurality of network communication technologies. A second pluggable interface device (i.e., one of pluggable interfaces 630b-630n) may be inserted into the port 625a of the gateway device 625, the second pluggable interface device (i.e., the one of pluggable interfaces 630b-630n) comprising at least one of hardware or software configured to allow the gateway device to communicate with the network using a second network communication technology among the plurality of network communication technologies, the second network communication technology being different from the first network communication technology, the gateway device comprising at least one of hardware or software that is common to at least the first network communication technology and the second network communication technology. The gateway device 625 may then establish a communication link with the network 610 via the second pluggable interface device (i.e., one of pluggable interfaces 630b-630n), using the second network communication technology.

In some embodiments, configuration settings for establishing the communication link with the network 610 via the second pluggable interface device may be retrieved from a database local to the gateway device 625 or from database 640 (via computing system 635 and network(s) 610), or the like.

According to some embodiments, each of the first and second pluggable interface devices might include, but is not limited to, one of a small form factor pluggable ("SFP") device, an enhanced SFP ("SFP+") device, a compact SFP ("CSFP") device, a 10 Gigabit SFP ("XFP") device, a gigabit interface converter ("GBIC"), or a mini GBIC, and wherein the port is configured to receive the one of the SFP device, the SFP+ device, the CSFP device, the XFP device, the GBIC, or the mini GBIC, and/or the like. Merely by way of example, in some instances, the plurality of network communication technologies might include, without limitation, at least one of a T1 access connection technology, a digital signal-1("DS1") access connection technology, an xDSL access connection technology, a WiFi access connection technology, 3G access connection technology, 4G access connection technology, 5G access connection technology, 700 MHz wireless access connection technology, a passive optical network ("PON") service technology, a gigabit PON ("GPON") service technology, an Ethernet fiber line service technology, an Ethernet PON ("EPON") service technology, a next generation PON ("NGPON") service technology, or a second generation NGPON or 40 Gigabit-capable PON ("NGPON2") service technology, and/or the like.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
removing a first pluggable interface device from a port in a gateway device, the first pluggable interface device comprising at least one of hardware or software configured to allow the gateway device to communicate with a network using a first network communication technology among a plurality of network communication technologies, wherein the first network communication technology comprises at least one of a T1 access connection technology, a digital signal-1 ("DS1") access connection technology, an xDSL access connection technology, a WiFi access connection technology, 3G access connection technology, 4G access connection technology, 5G access connection technology, 700 MHz wireless access connection technology, a passive optical network ("PON") service technology, a gigabit PON ("GPON") service technology, an Ethernet fiber line service technology, an Ethernet PON ("EPON") service technology, a next generation PON ("NGPON") service technology, or a second generation NGPON or 40 Gigabit-capable PON ("NGPON2") service technology;
inserting a second pluggable interface device into the port of the gateway device, the second pluggable interface device comprising at least one of hardware or software configured to allow the gateway device to communicate with the network using a second network communication technology among the plurality of network communication technologies, wherein the second network communication technology comprises another of at least one of a T1 access connection technology, a digital signal-1 ("DS1") access connection technology, an xDSL access connection technology, a WiFi access connection technology, 3G access connection technology, 4G access connection technology, 5G access connection technology, 700 MHz wireless access connection technology, a passive optical network ("PON") service technology, a gigabit PON ("GPON") service technology, an Ethernet fiber line service technology, an Ethernet PON ("EPON") service technology, a next generation PON ("NGPON") service technology, or a second generation NGPON or 40 Gigabit-capable PON ("NGPON2") service technology, wherein the second network communication technology is different from the first network communication technology, the gateway device comprising at least one of hardware or software that is common to at least the first network communication technology and the second network communication technology; and establishing, with the gateway device, a communication link with the network via the second pluggable interface device, using the second network communication technology.

2. The method of claim 1, wherein the gateway device comprises one of an optical network terminal ("ONT"), a network interface device ("NID"), an enhanced NID ("eNID"), a residential gateway ("RG") device, a business gateway ("BG") device, or a virtual gateway ("vG") device.

3. The method of claim 1, wherein each of the first and second pluggable interface devices are hot-swappable pluggable devices.

4. The method of claim 1, wherein each of the first and second pluggable interface devices comprises one of a small form factor pluggable ("SFP") device, an enhanced SFP ("SFP+") device, a compact SFP ("CSFP") device, a 10 Gigabit SFP ("XFP") device, a gigabit interface converter ("GBIC"), or a mini GBIC, and wherein the port is configured to receive the one of the SFP device, the SFP+ device, the CSFP device, the XFP device, the GBIC, or the mini GBIC.

5. The method of claim 4, wherein at least one of the SFP device, the SFP+ device, or the CSFP device comprises at least one of a SFP network interface device ("NID"), a SFP router, a SFP modem, or a SFP wireless access point.

6. The method of claim 1, wherein the plurality of network communication technologies comprises at least one of a T1 access connection technology, a digital signal-1 ("DS1") access connection technology, an xDSL access connection technology, a WiFi access connection technology, 3G access connection technology, 4G access connection technology, 5G access connection technology, 700 MHz wireless access connection technology, a passive optical network ("PON") service technology, a gigabit PON ("GPON") service technology, an Ethernet fiber line service technology, an Ethernet PON ("EPON") service technology, a next generation PON ("NGPON") service technology, or a second generation NGPON or 40 Gigabit-capable PON ("NGPON2") service technology.

7. The method of claim 1, further comprising:
determining, with the gateway device, whether a pluggable interface device is inserted into the port; and
based on a determination that the pluggable interface device is inserted into the port, automatically initiating, with the gateway device, configuration settings between the gateway device and the pluggable interface device that is inserted into the port.

8. The method of claim 7, wherein automatically initiating configuration settings between the gateway device and the pluggable interface device that is inserted into the port comprises:
identifying, with the gateway device, a network communication technology among the plurality of network communication technologies that is associated with the pluggable interface device that is inserted into the port;
retrieving, with the gateway device, configuration settings associated with the identified network communication technology from a data store, wherein the data store is at least one of a data store local to the gateway device or a remote data store accessible via the network; and
automatically initiating, with the gateway device, the retrieved configuration settings between the gateway device and the pluggable interface device that is inserted into the port.

9. A gateway device, comprising:
a port, wherein the port receives one of a plurality of pluggable interface devices, each pluggable interface device comprising at least one of hardware or software configured to allow the gateway device to communicate with a network using at least two network communication technologies among a plurality of network communication technologies, wherein at least one first network communication technology of the at least two network communication technologies comprises at least one of a T1 access connection technology, a digital signal-1 ("DS1") access connection technology, an xDSL access connection technology, a WiFi access connection technology, 3G access connection technology, 4G access connection technology, 5G access connection technology, 700 MHz wireless access connection technology, a passive optical network ("PON") service technology, a gigabit PON ("GPON") service technology, an Ethernet fiber line service technology, an Ethernet PON ("EPON") service technology, a next generation PON ("NGPON") service technology, or a second generation NGPON or 40 Gigabit-capable PON ("NGPON2") service technology, wherein at least one second network communication technology of the at least two network communication technologies comprises another of at least one of a T1 access connection technology, a digital signal-1 ("DS1") access connection technology, an xDSL access connection technology, a WiFi access connection technology, 3G access connection technology, 4G access connection technology, 5G access connection technology, 700 MHz wireless access connection technology, a passive optical network ("PON") service technology, a gigabit PON ("GPON") service technology, an Ethernet fiber line service technology, an Ethernet PON ("EPON") service technology, a next generation PON ("NGPON") service technology, or a second generation NGPON or 40 Gigabit-capable PON ("NGPON2") service technology, wherein the at least one second network communication technology is different from the at least one first network communication technology, and wherein at least two of the plurality of pluggable interface devices are different from each other;
at least one processor; and
a non-transitory computer readable medium communicatively coupled to the at least one processor, the non-transitory computer readable medium having stored thereon computer software comprising a set of instructions that, when executed by the at least one processor, causes the gateway device to:

determine whether a pluggable interface device is inserted into the port;

based on a determination that the pluggable interface device is inserted into the port, automatically initiate configuration settings between the gateway and the pluggable interface device that is inserted into the port; and establish a communication link with the network via the pluggable interface device that is inserted into the port, using the at least one first network communication technology or the at least one second network communication technology associated with the pluggable interface device that is inserted into the port.

10. The gateway device of claim 9, wherein the gateway device comprises one of an optical network terminal ("ONT"), a network interface device ("NID"), an enhanced NID ("eNID"), a residential gateway ("RG") device, a business gateway ("BG") device, or a virtual gateway ("vG") device.

11. The gateway device of claim 9, wherein each of the first and second pluggable interface devices are hot-swappable pluggable devices.

12. The gateway device of claim 9, wherein each of the first and second pluggable interface devices comprises one of a small form factor pluggable ("SFP") device, an enhanced SFP ("SFP+") device, a compact SFP ("CSFP") device, a 10 Gigabit SFP ("XFP") device, a gigabit interface converter ("GBIC"), or a mini GBIC, and wherein the port is configured to receive the one of the SFP device, the SFP+ device, the CSFP device, the XFP device, the GBIC, or the mini GBIC.

13. The gateway device of claim 12, wherein at least one of the SFP device, the SFP+ device, or the CSFP device comprises at least one of a SFP network interface device ("NID"), a SFP router, a SFP modem, or a SFP wireless access point.

14. A system, comprising:

a first pluggable interface device, the first pluggable interface device comprising at least one of hardware or software configured to allow a gateway device, a port of which the first pluggable interface device is inserted, to communicate with a network using a first network communication technology among a plurality of network communication technologies, wherein the first network communication technology comprises at least one of a T1 access connection technology, a digital signal-1 ("DS1") access connection technology, an xDSL access connection technology, a WiFi access connection technology, 3G access connection technology, 4G access connection technology, 5G access connection technology, 700 MHz wireless access connection technology, a passive optical network ("PON") service technology, a gigabit PON ("GPON") service technology, an Ethernet fiber line service technology, an Ethernet PON ("EPON") service technology, a next generation PON ("NGPON") service technology, or a second generation NGPON or 40 Gigabit-capable PON ("NGPON2") service technology;

a second pluggable interface device, the second pluggable interface device comprising at least one of hardware or software configured to allow the gateway device, the port of which the second pluggable interface device is inserted, to communicate with the network using a second network communication technology among the plurality of network communication technologies, wherein the second network communication technology comprises another of at least one of a T1 access connection technology, a digital signal-1 ("DS1") access connection technology, an xDSL access connection technology, a WiFi access connection technology, 3G access connection technology, 4G access connection technology, 5G access connection technology, 700 MHz wireless access connection technology, a passive optical network ("PON") service technology, a gigabit PON ("GPON") service technology, an Ethernet fiber line service technology, an Ethernet PON ("EPON") service technology, a next generation PON ("NGPON") service technology, or a second generation NGPON or 40 Gigabit-capable PON ("NGPON2") service technology, wherein the second network communication technology is different from the first network communication technology; and the gateway device, comprising:

the port, wherein the port receives one of a plurality of pluggable interface devices, each pluggable interface device comprising at least one of hardware or software configured to allow the gateway device to communicate with the network using one network communication technology among the plurality of network communication technologies, the second network communication technology being different from the first network communication technology, wherein the gateway device comprises at least one of hardware or software that is common to at least the first network communication technology and the second network communication technology;

at least one processor; and a non-transitory computer readable medium communicatively coupled to the at least one processor, the non-transitory computer readable medium having stored thereon computer software comprising a set of instructions that, when executed by the at least one processor, causes the gateway device to:

determine whether a pluggable interface device is inserted into the port;

based on a determination that the pluggable interface device is inserted into the port, automatically initiate configuration settings between the gateway and the pluggable interface device that is inserted into the port; and establish a communication link with the network via the pluggable interface device that is inserted into the port, using the network communication technology associated with the pluggable interface device that is inserted into the port.

15. The system of claim 14, wherein the gateway device comprises one of an optical network terminal ("ONT"), a network interface device ("NID"), an enhanced NID ("eNID"), a residential gateway ("RG") device, a business gateway ("BG") device, or a virtual gateway ("vG") device.

16. The system of claim 14, wherein each of the first and second pluggable interface devices are hot-swappable pluggable devices.

17. The system of claim 14, wherein each of the first and second pluggable interface devices comprises one of a small form factor pluggable ("SFP") device, an enhanced SFP ("SFP+") device, a compact SFP ("CSFP") device, a 10 Gigabit SFP ("XFP") device, a gigabit interface converter ("GBIC"), or a mini GBIC, and wherein the port is configured to receive the one of the SFP device, the SFP+ device, the CSFP device, the XFP device, the GBIC, or the mini GBIC.

18. The system of claim 17, wherein at least one of the SFP device, the SFP+ device, or the CSFP device comprises at least one of a SFP network interface device ("NID"), a SFP router, a SFP modem, or a SFP wireless access point.

* * * * *